3,378,070
HYDROXYETHYL CELLULOSE COMPLEX AND METHOD OF PLUGGING UNDERGROUND FORMATIONS THEREWITH
Gerald A. Wessler and Walter N. Epler, Duncan, Okla., assignors to Halliburton Company, Duncan, Okla., a corporation of Delaware
No Drawing. Filed Sept. 3, 1965, Ser. No. 485,108
12 Claims. (Cl. 166—22)

ABSTRACT OF THE DISCLOSURE

This patent describes a novel tough rubber-like complex of hydroxyethyl cellulose and a polyvalent metal ion, its method of preparation, and the method of forming a tough viscous plug in an underground formation by the injection therein of a basic solution of hydroxyethyl cellulose and a polyvalent metal ion.

---

This invention relates to a novel method and composition for temporarily plugging subterranean formations utilizing a hydroxyethyl cellulose hydrated in water and complexed with a salt containing a polyvalent metal ion.

In the treatment of wells drilled into the earth strata, it is oftentimes necessary to form a viscous tough plug to prevent flow of liquid into the formation being treated. At the present time the plug is commonly formed from a natural gum such as guar, starch, or other similar polymeric materials and a complexing agent. The gums are characterized by a tendency to leave a residue after breaking or reducing their viscosity. This is an undesirable property because the residue may cause damage to the matrix of the formation.

According to the present invention it has been found that hydroxyethyl cellulose may be chemically complexed to form a rubber-like, tough, viscous material suitable for the formation of a plug, and which upon breaking does not leave a residue of the type which tends to damage the formation. It has been found that the novel complex of hydroxyethyl cellulose produces the desired plugging action initially due to its thickness but is capable of reverting to a thin fluid which can be easily removed from the well bore leaving no impairment of permeability.

Accordingly, it is an object of this invention to provide a novel plugging material for use in wells.

Another object of the present invention is to provide a novel complex hydroxyethyl cellulose material capable of forming a tough rubber-like plug which will not leave a residue in the formation upon breaking.

These and other objects of the invention will become apparent from the more detailed description which follows.

SUMMARY OF INVENTION

Briefly, the present invention comprises a novel tough rubber-like hydroxyethyl cellulose complex prepared by adding a polyvalent metal ion to hydrated hydroxyethyl cellulose in a basic aqueous solution. The complex obtained is particularly adapted for injection down the bore hole of a well into the formation to provide fracturing and the formation of a tough plug capable of preventing the flow of fluids into the formation. Accordingly, the process of injecting the complex into a well is also within the scope of the present invention.

While not bound by any theory or possible mechanism, it is believed that the complex is formed by interaction between the hydroxyl groups on the hydroxyethyl cellulose and the polyvalent metal ion. It has generally been believed that adjacent hydroxyl groups in the cis position are required for the formation of complexes between hydroxy compounds and metals such as copper. However, quite surprisingly we have found that the complex formations are effective with hydroxyethyl cellulose even where the hydroxyl groups are otherwise arranged, such as in the adjacent trans position. Thus, according to this invention a wide variety of reaction products of hydroxyethyl cellulose and polyvalent metal salts are obtainable.

The hydroxyethyl cellulose used in the preparation of the novel complex of this invention is non-ionic water-soluble polymer. While any hydroxyethyl cellulose may be used, the preferred hydroxyethyl cellulose for use herein is sold under the trade name "Natrosol" by the Hercules Powder Company of Wilmington, Delaware. Natrosol contains adjacent trans hydroxyl groups and is available in various viscosities as shown in the following table.

TABLE A.—VISCOSITY LIMITS OF WATER SOLUTIONS

| Viscosity Type | Brookfield Viscosity at 25° C. at varying Concentrations (cps.) | | |
|---|---|---|---|
| | 1% | 2% | 5% |
| H | 1,500–2,500 | 25,000 | |
| M | | 4,500–6,500 | |
| G | | 150–400 | |
| J | | | 150–400 |
| L | | | 75–150 |
| HH | 3,000–4,000 | 80,000–100,000 | |

All viscosity types conform to the following additional specifications:

pH _____ 6.5–8.5.
Color _____ White to slight tan.
Moisture (as packed), percent _____ 5 (max.).
Particle size: passing U.S. #40 mesh,
 percent _____ 90 (min.).
Bulk density, g./ml. _____ 0.55–0.75.

The polyvalent metal ions for use in the complexing reaction are provided by salts of polyvalent metals including plumbic chromate, plumbic chloride, manganese chloride, cadmium nitrate, cupric chloride, cupric sulfate, or any other polyvalent metal salt which complexes with hydroxyl groups.

The complexing reaction is carried out in basic aqueous solution. The particular source of the hydroxy ion is not critical and any source of hydroxy ion which gives a sufficiently high pH value is adequate. The preferred bases are sodium hydroxide and hydrated lime (calcium hydroxide). The amount of basic material added to the aqueous solution is generally sufficient to maintain the pH at a level of from about 8 to about 14. In the case of sodium hydroxide it has been found that from about 0.05 to about 0.1% by weight of the solution is sufficient to initiate the complexing reaction.

The relative amounts of the hydroxyethyl cellulose and metal ion necessary for the complexing reaction are not critical and may be varied over a wide range of proportions. Practical ranges of concentration for the hydroxyethyl cellulose would generally be from about 0.2% to about 1.5% by weight of the solution, the upper limit being dictated solely by economic considerations. The complexing ions are generally present in an amount from about 0.025 to about 0.125% by weight of the solution for concentration of hydroxyethyl cellulose equal to 0.75% by weight of the solution. This ratio of concentration generally holds for any given concentration of hydroxyethyl cellulose.

The complex can be formed in a variety of basic aqueous solutions containing other dissolved or suspended materials. For example, the complexes may be formed in a fresh water solution. Alternatively, the solution may contain various other additives which are commonly present in well treating compositions. Thus the solution may contain sodium chloride, generally in an amount from about 10% by weight of solution up to the saturated sodium chloride concentration; and calcium chloride in an amount equal to about 2% by weight of the solution up to saturation.

After the complexing has occurred in the basic aqueous solution the product is a material having a tough rubber-like consistency. This material may be used in wells as a diverting material in connection with stimulation and workover operations. The complex of this invention may also be used to obtain multiple fractures by injecting small batches of the material periodically during the fracturing treatment. This injection minimizes the flow into the already fractured area and allows further breakdown of the formation in some other area. In addition the novel complex of this invention can be spotted on the bottom of a well bore to assist in fracturing or treating the upper part of an exposed zone. In another aspect, the complex can be pumped around uncemented casing where it offers sufficient resistance to flow to permit low pressure fracturing treatments.

The novel complex is generally suitable as a temporary plugging or diverting material, and may be placed in a well using equipment familiar to those skilled in the art. By forming a plug in the well, it is possible to fracture several formations without the necessity for resetting a packer. The plugging of one formation also permits testing or completion of another formation in the well. Plugging is also effective for sealing thief or water zones and for sealing channel leaks between two or more formations.

The normal complex of this invention has been found to be stable over a wide range of temperatures from room temperature up to 300° F. or higher. However, if it is desired to break down the complex for removal from the well bore, this may be readily accomplished by treatment with any of the common acid materials, such as hydrochloric acid, or other chemicals which can be pumped through or into contact with the complex to bring about reversion to a thin fluid. This treatment permits the complete removal of the complex from the formation without leaving an undesirable residue.

The following examples are presented solely to illustrate the invention and accordingly should not be regarded as limiting in any way. In the examples, the parts and percentages are by weight unless otherwise indicated.

Example I

To 1000 gallons of fresh water at 80° F. was added 40 pounds of hydroxyethyl cellulose (Natrosol HH), 4 pounds of cupric sulfate and 12 pounds of sodium hydroxide. After thorough mixing by mechanical agitations, a good complex was formed.

The foregoing example was repeated using 3 pounds of copper sulfate in lieu of 4 pounds of cupric sulfate, with the other concentrations remaining the same. A medium complex was obtained.

Example II

To 1000 gallons of water at 80° F. containing 10% by weight of sodium chloride was added 40 pounds of hydroxyethyl cellulose (Natrosol HH), 4 pounds of cupric sulfate and 18 pounds of sodium hydroxide. After agitation a medium complex was formed.

When the foregoing example is repeated utilizing 2% by weight of the solution of calcium chloride in lieu of the 10% solution of sodium chloride, and 12 pounds of sodium hydroxide in lieu of 18 pounds, a medium complex was again obtained.

Example III

To 1000 gallons of water was added 4 pounds of cupric sulfate and 40 pounds of hydroxyethyl cellulose (Natrosol HH). The solution was agitated as in the foregoing examples. Then various amounts of sodium hydroxide or calcium hydroxide were added to complex the metal with the hydroxyethyl cellulose. Thereafter, small portions of the tough complex material were heated at various temperatures and the break time observed at each of these temperatures. These data are tabulated in the following table.

TABLE 1

| Solution | Fresh water | | 10% Sodium Chloride | |
|---|---|---|---|---|
| Sodium Hydroxide [1] | 11 | | | 10 |
| Calcium Hydroxide [1] | | 10 | 5 | |
| Results | Complex | Complex | Complex | Complex |
| Break Time (hrs. min): | | | | |
| 0:30 | | 180 | 180 | 160 |
| 1:00 | 180 | 160 | 160 | 180 |
| 1:00 | 160 | 140 | | |
| 1:45 | 140 | | | |
| 3:30 | 120 | | | 140 |
| 18:00 | 100 | 120 | 120 | |
| 18:00 | 80 | 100 | 100 | |

[1] Lbs./1,000 gal.

When Example III was repeated utilizing lead chromate, manganese chloride, cadmium nitrate, and cupric chloride, in lieu of cupric sulfate, a satisfactory complex was again formed. When it was attempted to form a complex between the hydroxyethyl cellulose and aluminum, sodium borate and sodium chromate, respectively, little or no complexing occurred.

Example IV

In the manner already described, complexes were prepared with plumbic chloride using a solution containing 1000 gallons of water per 60 pounds of hydroxyethyl cellulose. The nature of the resulting gel at the various concentration levels of the lead chloride is indicated in the following table.

TABLE 2
Solution, 10% Sodium Chloride.
Temperature, 80° F.

| Lead Chloride (lb./1,000 gal.) | 10 lb. | 8 lb. | 6 lb. | 4 lb. | 2 lb. | 0 lb. |
|---|---|---|---|---|---|---|
| Complex when mixed | Good | Firm | Firm | Firm | Firm | Soft. |
| 6 hours | Very good | Very good | Very good | Very good | Very good | Soft. |

Solution, 2% Calcium Chloride.
Temperature, 80° F.

| Lead Chloride (lb./1,000 gal.) | 10 lb. | 8 lb. | 6 lb. | 4 lb. | 2 lb. | 0 lb. |
|---|---|---|---|---|---|---|
| Complex when mixed | Good | Good | Good | Good | Good | Soft. |
| 6 hours | Very good | Very good | Very good | Very good | Very good | Soft. |

All complexes were good after 24 hours.

As used herein, the term "complex" is not intended to denote any particular type of bonding or association between the polyvalent metals and the hydroxyethyl cellulose. The mechanism involved is not fully understood and may involve one or more types of chemical interaction, chelation and the like. Therefore, the "complex" of our invention encompasses any tough rubbery material resulting from the contact of the polyvalent metals with hydroxyethyl cellulose.

While the utility of the novel complexes of this invention have been with particular reference to well treatment, it will be apparent that this tough rubber-like material will find many uses in other fields. Accordingly, the invention is not to be limited in any respect, but rather is of the full scope of the appended claims.

We claim:
1. The novel tough rubber-like complex prepared by complexing hydroxyethyl cellulose with a lead chloride in a basic aqueous medium.

2. The composition of claim 1 wherein the hydroxyethyl cellulose contains adjacent hydroxyl groups.

3. The composition of claim 1 wherein the hydroxyethyl cellulose contains adjacent trans hydroxyl groups.

4. The method of preparing a novel tough rubber-like complex which comprises complexing hydroxyethyl cellulose with a lead chloride in a basic aqueous solution having a pH of from about 8 to about 14.

5. The method of forming a viscous tough plug in an underground formation which comprises injecting into the formation a basic solution of hydroxyethyl cellulose and a polyvalent metal ion.

6. The method of claim 5 wherein the basicity is provided by sodium hydroxide.

7. The method of claim 5 wherein the polyvalent metal ions are present in a concentration of from about 0.025 to 0.125% by weight of the solution.

8. The method of claim 5 wherein the hydroxyethyl cellulose is present in an amount of from about 0.2% to 1.5% by weight of the solution.

9. The method of forming a viscous tough plug in an underground formation which comprises injecting into the formation a basic solution of hydroxyethyl cellulose containing adjacent trans hydroxyl groups and a polyvalent metal ion.

10. The method of forming a viscous tough plug in an underground formation which comprises injecting into the formation a basic solution of hydroxyethyl cellulose and a cupric sulfate.

11. The method of forming a viscous tough plug in an underground formation which comprises injecting into the formation a basic solution of hydroxyethyl cellulose and a lead chloride.

12. The method which comprises injecting into an underground formation a basic solution of hydroxyethyl cellulose and a polyvalent metal ion to form a viscous tough rubbery plug in said formation, thereafter reducing said plug to a fluid by contact with a breaking agent, and removing said fluid to leave the formation free of clogging residues.

References Cited
UNITED STATES PATENTS

| | | | |
|---|---|---|---|
| 2,034,347 | 3/1936 | Loomis et al. | 166—32 |
| 2,439,833 | 4/1948 | Wagner | 166—22 |
| 2,445,374 | 7/1948 | Van Wyck | 106—194 |
| 2,570,947 | 10/1951 | Himel et al. | 252—8.5 |
| 2,687,375 | 8/1954 | Fischer et al. | 252—8.5 |
| 2,876,839 | 3/1959 | Fast et al. | 166—22 |
| 2,961,400 | 11/1960 | Park | 252—8.55 |
| 3,049,433 | 8/1962 | Butler | 106—194 X |
| 3,058,909 | 10/1962 | Kern | 252—8.55 |
| 3,241,612 | 3/1966 | Hiller | 166—32 X |
| 3,251,781 | 5/1966 | Jordan | 252—316 |

FOREIGN PATENTS 726,757  10/1942  Germany.

OTHER REFERENCES

Ott, Emil et al.: Cellulose and Cellulose Derivatives, New York, Interscience Pub., 1954, pp. 948 and 1074 QD 321.089.

CHARLES E. O'CONNELL, *Primary Examiner.*

I. A. CALVERT, *Assistant Examiner.*